April 6, 1948.    J. W. RIEKE ET AL    2,438,947
ELECTRONIC MODULATION AND MODULATION CORRECTION CIRCUITS
Filed July 28, 1943    3 Sheets-Sheet 1
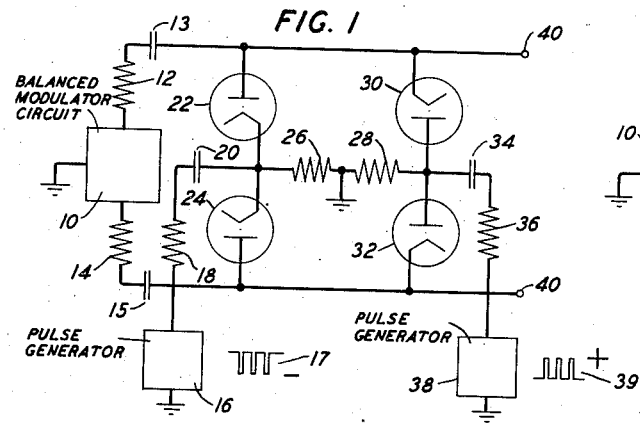
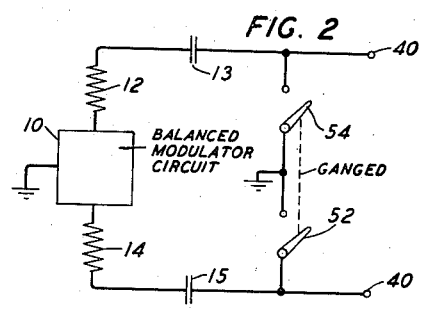
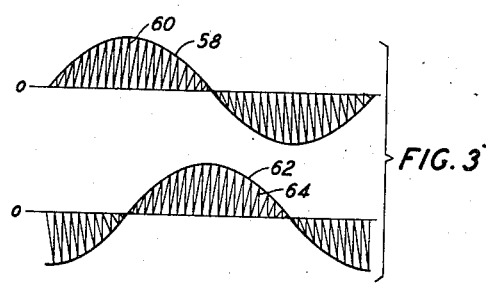
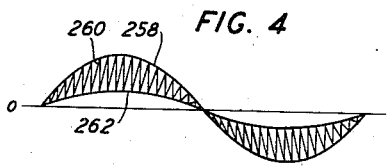
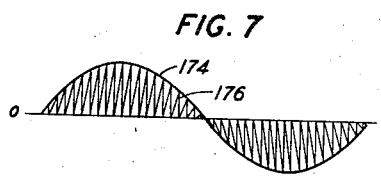
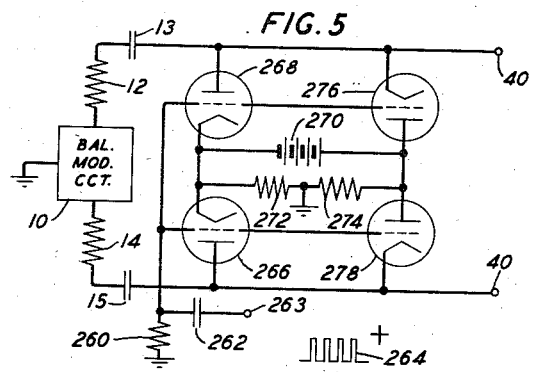
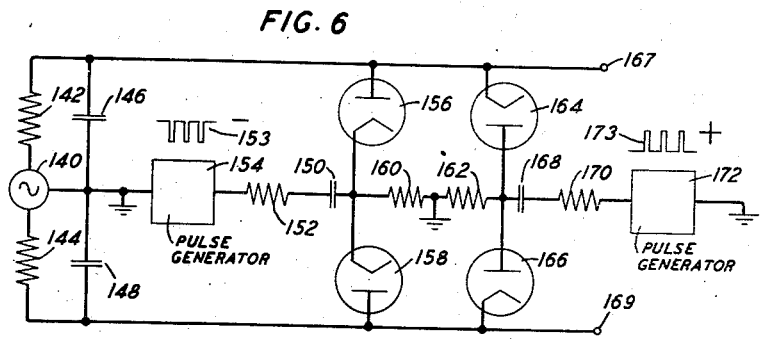
INVENTORS: J. W. RIEKE
R. J. SHANK
BY
H. O. Wright
ATTORNEY April 6, 1948.  J. W. RIEKE ET AL  2,438,947

ELECTRONIC MODULATION AND MODULATION CORRECTION CIRCUITS

Filed July 28, 1943  3 Sheets-Sheet 2

INVENTORS: J. W. RIEKE
R. J. SHANK

BY H. C. Wright
ATTORNEY

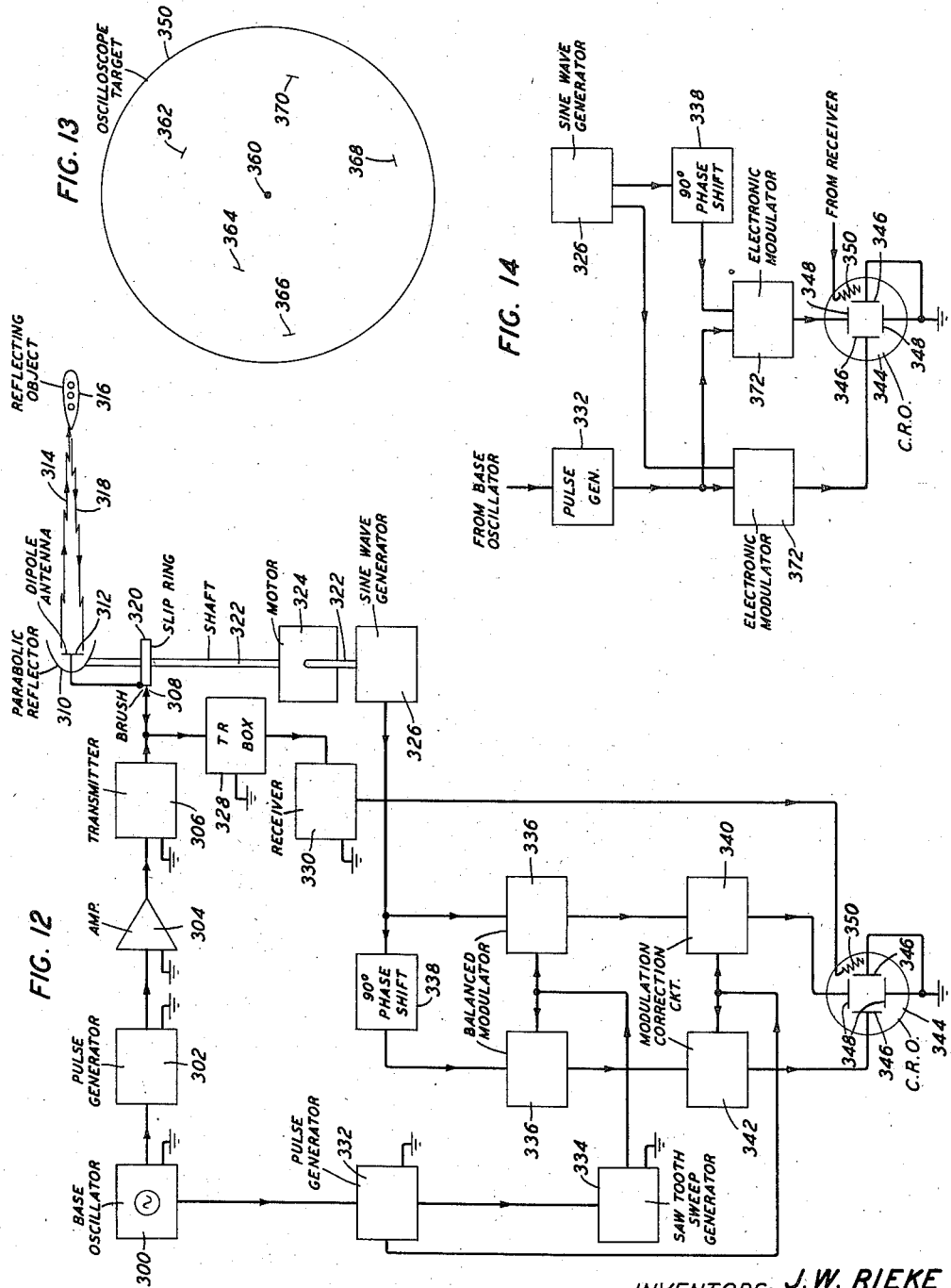

Patented Apr. 6, 1948

2,438,947

UNITED STATES PATENT OFFICE 2,438,947

ELECTRONIC MODULATION AND MODULATION CORRECTION CIRCUITS

John W. Rieke and Robert J. Shank, New York, N. Y., assignors to Bell Telephone Laboratories, Incorporated, New York, N. Y., a corporation of New York Application July 28, 1943, Serial No. 496,410

9 Claims. (Cl. 179—171.5)

This invention relates to improvements in pulse-reflection object locating systems of the type in which the area surrounding an observation point is scanned by revolving a directive pulsed radio beam to scan the area, reflections from objects in the area are received at the observation point and the information obtained is plotted, as received, upon an oscilloscope or equivalent indicating device about a center point on the screen thereof, corresponding to the observation point, each object being indicated at an angle corresponding to its true azimuth angle and at a distance from the center point on the screen of the oscilloscope proportional to the actual distance of the object from the observation point. This type of system is commonly referred to as a plan position indicating system. More particularly this invention relates to improved circuits and methods of controlling the indicating means of plan position indicating systems to more faithfully and facilely produce the desired type of indication. The circuits of the invention will be referred to hereinafter as modulation correction circuits and electronic modulator circuits.

Typical plan-position indicating systems of the prior art are described in the copending application of N. W. Bryant, Serial No. 423,757, filed December 20, 1941 and assigned to applicants' assignee.

These prior art systems generate sine and cosine waves which are in synchronism with the rotating antenna and modulate them by a sawtooth wave. The modulated sine wave is then applied to one pair of deflecting plates of a cathode ray oscilloscope and the modulated cosine wave is applied to the other pair, thus producing a radial scanning action which rotates in synchronism with the antenna. Received reflections of the emitted pulses are amplified and applied to an intensity control anode of the oscilloscope so that indications appear on the target of the oscilloscope for each object from which reflections are received, the pattern of indications providing the plan position type of indication described above.

Sine and cosine waves modulated in the desired manner by a saw-tooth wave as required for such systems are shown in Fig. 3 of the accompanying drawings. Mathematically these waves can be expressed as the direct product of the saw-tooth and the sine or cosine voltage as follows:

$$e_1' = E \sin \omega t \quad (1)$$
$$e_2' = E \cos \omega t \quad (2)$$
$$e_s = f(t_2) \quad (3)$$
$$e_1 = Ef(t_1) \sin \omega t \quad (4)$$
$$e_2 = Ef(t_1) \cos \omega t \quad (5)$$

where $e_1'$=the sine wave voltage
$e_2'$=the cosine wave voltage
$e_s$=the saw-tooth wave voltage
$e_1$=the sine wave modulated by the saw-tooth wave
$e_2$=the cosine wave modulated by the saw-tooth wave and the time $t_1$ is measured from the start of each sweep.

These equations correspond to a modulation process in which the terms due to the steady state, or to the condition of no signal current in the modulating tubes, have been eliminated. Experience with modulator circuits has demonstrated that this condition is difficult to obtain without encountering appreciable distortion by virtue of the cut-off characteristics of the modulating tubes.

The desired results can, however, be readily obtained by operating the tubes to obtain a good linear modulation characteristic and subsequently removing the terms arising from the steady current. By use of a conventional balanced modulator circuit as shown in Fig. 12 of the accompanying drawings with the saw-tooth wave applied in the longitudinal path and the sine (or cosine) wave applied to the balanced path, the saw-tooth modulation components corresponding to the steady state current can be balanced out in the modulator so that only a sine wave term remains to be removed. Second or higher order products of modulation can be disregarded for the uses contemplated. A sawtooth modulated sine (or cosine) wave with an unwanted sine wave component such as is produced in the balanced modulator arrangement just described is shown in Fig. 4 of the accompanying drawings.

Various means for removing this unwanted sine wave component and other means for producing directly sine (or cosine) waves modulated suitably for use in ray deflecting circuits for plan position cathode ray indicators constitute the substance of this invention and will be explained in detail hereinafter.

An object of the invention is, therefore, to provide improved methods and means for producing suitable deflecting voltages for use in ray deflecting circuits for oscilloscopes of plan position indicating systems.

Other and further objects will become apparent during the course of the following description of preferred embodiments of the invention taken in conjunction with the accompanying drawings in which:

Fig. 1 represents in schematic diagram form a circuit of the invention by which the unwanted sine wave component of a saw-tooth modulated sine or cosine wave can be conveniently removed;

Fig. 2 is a simplified equivalent schematic circuit employed in explaining the operation of the circuit of Fig. 1;

Fig. 3 illustrates ideal saw-tooth modulated sine and cosine waves;

Fig. 4 illustrates a saw-tooth modulated sine or cosine wave in which an unwanted sine wave component is present;

Fig. 5 represents a circuit of the type shown in Fig. 1 but using triode vacuum tubes in lieu of diode vacuum tubes;

Fig. 6 represents an application of the electronic switching circuit of the invention suitable for producing sweep modulation of an unmodulated sine or cosine wave;

Fig. 7 illustrates the type of modulated wave produced by the circuit of Fig. 6;

Fig. 12 shows in block schematic diagram form a plan position indicating system including modulation correction circuits;

Fig. 13 shows a typical plan position indication; and

Fig. 14 shows in block schematic diagram form the modifications of the circuit of Fig. 12 resulting from the substitution of electronic modulators for modulation correction circuits.

Figure 11:
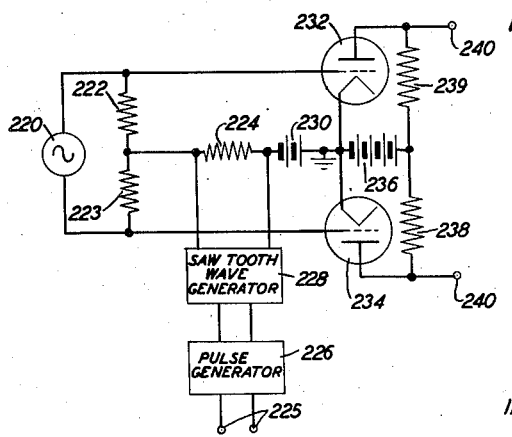
Fig. 11 shows in schematic diagram form a conventional balanced modulator circuit arranged to modulate a sine wave by a saw-tooth wave.

In more detail in Fig. 1 balanced modulator circuit 10 is a source providing a sine or cosine wave modulated by a saw-tooth wave, the output of which includes an unwanted sine wave modulation, or low frequency component, as illustrated in Fig. 4. Modulator 10 can be preferably a balanced modulator circuit of conventional form such as is illustrated in Fig. 11 and described in detail hereinunder.

Pulse generators 16 and 38 are sources each of which provides a series of pulses, generator 16 providing negative pulses 17 and generator 38 providing positive pulses 39, respectively, in practice generators 16 and 38 can be a single equivalent pulse generator providing both positive and negative pulses. This can of course conveniently be accomplished, as is well known in the art, by use of a "cathode follower" vacuum tube circuit in which pulses of one polarity are obtained from the anode circuit and pulses of the opposite polarity are obtained from the cathode circuit. In either case the pulses are synchronized so that a pair of pulses of opposite polarities occur at the start of each sweep of the saw-tooth wave by which the sine or cosine wave from modulator 10 is modulated.

Diode vacuum tubes 22, 24, 30 and 32 act as electronic switches operated by the pulses from generators 16 and 38, which as above noted are synchronized to occur just before each saw-tooth sweep provided by the saw-tooth modulation starts.

The switching action of the diodes can be explained as follows:

The pulses are applied in such polarity as to cause conduction through the diodes in series. This reduces the impedance across output terminals 40 so that the condensers 13 and 15 can discharge through the operated diodes. Resistances 12 and 14 should be small with respect to the reactances of condensers 13 and 15 so that the impedances of these combinations are predominantly capacitative.

Also during conduction of the diodes associated therewith condensers 20 and 34 take on charges. These charges are of such polarity that, at the end of a pulse, they maintain the diodes at cut-off until another pulse occurs. These charges can slowly leak off through resistors 18 and 26 and resistors 28 and 36, respectively. Resistances 18 and 36 represent the impedances of the pulse generators and should be small so that the pulse finds a low impedance path through resistor 18, capacity 20, diodes 22 and 24 and through resistor 36, capacity 34, diodes 30 and 32, respectively. Resistors 26 and 28 should be made large so that the time constant, or product of resistance by capacity, for the discharge of condensers 20 and 34 as above described, is large compared to the repetition rate of the pulses. For example, a commonly used pulse rate is 800 per second and the time constants of these R. C. circuits should then be in the order of $1/20$ second.

The amplitude of the control pulses 17 and 39 must exceed the maximum amplitude of the voltage of modulator 10 so that the diodes will not become conductive except during a pulse. In other words the bias maintained by condensers 20 and 34 must at all times during the normal operation of the circuit exceed the maximum value of the voltage of modulator circuit 10.

In Fig. 2 the portion of the circuit of Fig. 1 including the diodes 22, 24, 30 and 32 is replaced by a mechanical diagrammatical equivalent comprising two simple single pole switches 52 and 54 which are ganged together so as to open and close together. If it were practicable to mechanically operate these switches at the proper moments they would produce substantially the same results as are produced by the diode circuit.

The voltage appearing across terminals 40 can be impressed directly upon one pair of the deflecting plates of the cathode ray oscilloscope, or if desirable it may first be amplified in a balanced "direct-current" amplifier and then impressed upon the deflecting plates. Two identical circuits are of course required, one for the sine and the other for the cosine wave, the output of one circuit being impressed upon the horizontal deflecting plates and the output of the other circuit being impressed upon the vertical deflecting plates. The combination thus obtained produces the desired radial sweep, turning about the center of the target in synchronism with the rotation of the exploratory beam of the plan position indicating system provided the sine and cosine waves are synchronized with the antenna rotation. A complete object locating system including a circuit of this type is shown in block schematic diagram form in Fig. 12 which will be described hereinafter.

In Fig. 3 the ideal forms of sine and cosine waves modulated by saw-tooth waves, for producing the desired sweeping action for a plan position indication are illustrated. Waves 58 and 62 are the sine and cosine envelopes and waves 60 and 64 are these envelope waves modulated by the saw-tooth sweep wave.

In Fig. 4 the presence of an unwanted sine wave or low frequency component is illustrated such as would normally be encountered in modulating sine or cosine waves by a balanced modulator circuit of the type described in connection with Fig. 11 hereinafter. Circuits of the type illustrated in Fig. 1 are of course designed to eliminate this unwanted sine wave component and convert waves of the type shown in Fig. 4 to waves of the type shown in Fig. 3. For this reason they will be referred to as modulation correction circuits.

A modification of the circuit of Fig. 1 to employ triode vacuum tubes 266, 268, 276 and 278 in place of the diodes of Fig. 1 is shown in Fig. 5. In this circuit positive control pulses 264 only are required and they are applied to the control grids of the triodes through terminal 263, series capacitor 262 and shunt resistor 260.

Direct-current voltage source 270 and resistors 272 and 274 function to provide a source of energy for the conduction of triodes and to establish the average potential at terminals 40 at ground, respectively.

Resistor 260 and capacitor 262 function to bias the grids of all triodes below plate current cut-off between pulses such as resistors 26 and 28 and condensers 20 and 34 did in the diode circuit, Fig. 1, when the control pulses 264 are applied between terminal 263 and ground.

In Fig. 6 is shown a circuit closely resembling that of Fig. 1 except that it includes in place of the balanced modulator 10 of Fig. 1, a simple sine wave generator 140, and capacitors 146 and 148 are in shunt relation thereto instead of in series as for capacitors 13 and 15 of Fig. 1. The circuit of Fig. 6 under control of pulses 153 and 173 will produce a wave form, shown in Fig. 7, substantially identical with those of Fig. 3 produced by the circuit of Fig. 1.

The action of the circuit of Fig. 6 is as follows:

The pulses 153 and 173 cause the pairs of diodes 156, 158 and 164, 166, respectively, to conduct. Pulse generators 154 and 172 generate pulses 153 and 173, respectively. They can be self-actuated multivibrators of any of the numerous types well known in the art or they can, alternatively, be actuated by energy derived from the source controlling the radar transmitter of the radar system in which the circuit of Fig. 6 is to be used. The voltage across output terminals 167, 169 is zero during the pulse intervals. At the end of a pulse interval condensers 146, 148 begin to charge on an exponential curve determined by the time constants of the combinations of resistor 142, capacitor 146, and resistor 144, capacitor 148, these combinations being substantially identical. The charging action can be approximated mathematically by the equation:

$$e_{out} = E\left(1 - e^{-\frac{t_1}{RC}}\right) \sin \omega t \doteq \frac{Et_1}{RC} \sin \omega t \quad (6)$$

where $e_{out}$ = voltage across terminals 167, 169
$E$ = (peak) voltage of generator 140
$e = \epsilon = 2.718+$
$t_1$ = time from end of last pulse
$t$ = time
$\omega = 2\pi f$
$f$ = frequency of rotation of antenna Equation 6 corresponds to the desired product modulation of a sine function and a saw-tooth or saw-tooth approximating exponential function of time so that, obviously, the output of the circuit of Fig. 6 will have the desired properties. The remainder of the elements of the circuit of Fig. 6 are substantially the same and employed in the same way as the corresponding elements of the circuit of Fig. 1.

The type of wave produced by the circuit of Fig. 6 is illustrated in Fig. 7 and is substantially the same as the type illustrated in Fig. 3.

Two such modulating circuits in which the "sine" wave inputs are 90 degrees out of phase will provide the two deflecting waves necessary to produce the desired rotating radial sweep of a cathode oscilloscope beam. The circuits can be connected directly to the deflecting plates of the oscilloscope or their outputs can first be amplified and then applied to electrostatic or electromagnetic deflecting elements of an oscilloscope. For convenience circuits of the type illustrated by Fig. 6 will be referred to as electronic modulators.

Figure 8:
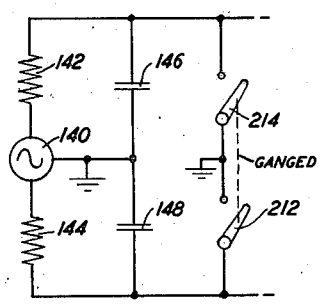
Fig. 8 is a simplified equivalent schematic circuit employed in explaining the circuit of Fig. 6.

Fig. 8 shows in mechanical diagrammatical equivalent form the circuit of Fig. 6 the ganged switches 212 and 214 being substituted for the four diodes of Fig. 6. Again, if it were practicable to mechanically operate these switches at the proper moments they would produce substantially the same results as are produced by the diodes of Fig. 6.

The above-described switching circuits of Figs. 1 and 6 can of course provide longer periods in which the circuit output voltage is zero by simply employing control pulses of longer duration and increasing the capacity of condensers 150 and 168 of Fig. 6 or 20 and 34 of Fig. 1 so that conduction through the diodes will be maintained during the entire width of the clamping pulse. When so modified the circuits can obviously be employed to provide an expanded section of a plan position indication by confining the sweeping interval to any desired fraction of the normal full range sweep time and amplifying the saw-tooth sweep voltage so that the ray sweeps from the center of the target to the periphery during each fractional portion of the normal sweeping interval chosen.

Figure 9:
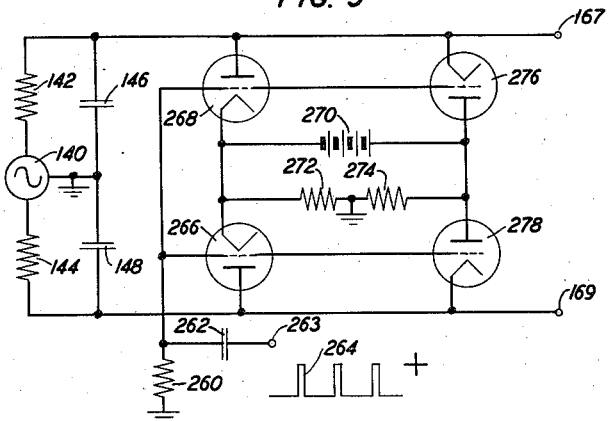
Fig. 9 illustrates the use of triode vacuum tubes in place of the diodes used in the circuit of Fig. 6.

Again, as for Fig. 1, the switching action of the circuit of Fig. 6 can be accomplished by using triodes 266, 268, 276 and 278 in lieu of the diodes. The control pulses are then applied to the grids of the triodes as illustrated in Fig. 9, the circuit of Fig. 9 bearing substantially the same relation to that of Fig. 5 which the circuit of Fig. 6 bears to that of Fig. 1.

Figure 10:
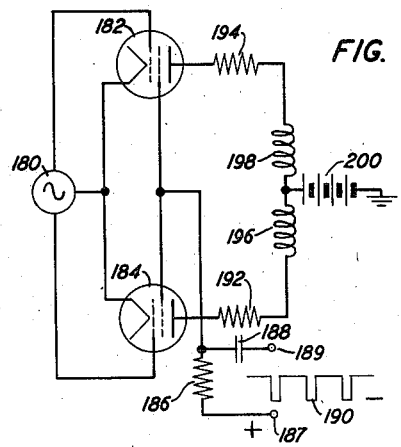
Fig. 10 illustrates the application of a circuit of the invention for use with a magnetic coil deflection type oscillograph.

Fig. 10 shows a variation of electronic switching circuit adapted for use with a cathode ray oscilloscope which employs electromagnetic deflecting coils. The switching circuit employs screen grid tubes, in which the switching action is obtained by applying negative pulses to the screen electrodes. The operation of this circuit is as follows:

Pulse 190 is applied to the screens of the screen grid tubes 182 and 184, causing the tubes to cut-off completely reducing the current in the oscilloscope deflection coils 196 and 198 to zero. After the pulse, current will build up through coils 196 and 198 at a rate determined by the time constant of the circuit, i. e., the inductance of the circuit divided by the total series resistance of the circuit and the sine wave voltage from source 180 applied at the grids of tubes 182 and 184.

In Fig. 11 a conventional balanced modulator suitable for use in the circuits of Figs. 1 and 5 is shown in schematic form. Generator 220 supplies in sine wave to the resistors 222, 233 which are located in the cathode grid circuits of the push-pull coupled triodes 232, 234. In the common portion of the cathode grid circuit a series resistor 224 is connected across the output of a saw-tooth wave generator 228. Generator 228 is actuated by pulses from pulse generator 226 which is in turn actuated by a source such as the source which controls the emission of the exploratory pulses of a conventional pulse-reflection type object locating system, so that the saw-tooth sweep will be synchronized properly for range measurement of reflected pulses in the conventional manner. With this arrangement the output wave across resistors 238, 239 appearing at terminals 240 will be the input sine wave from source 220 modulated by the saw-tooth wave from generator 228, but with normal operation it will have an unwanted sine wave component, such as component 262 of the wave of Fig. 4, which must be eliminated by circuits of the invention, such as those of Fig. 1 or Fig. 5, to obtain the ideal type of waves illustrated in Fig. 3.

In Fig. 12 a pulse reflection type, plan position indicating object location system employing modulation correction circuits of this invention is illustrated in schematic block diagram form. The system comprises a base oscillator 300 which provides a sine wave of relatively low frequency, for example frequencies of from 400 to 4,000 are usually employed. Pulse generator 302 produces a sharp positive pulse of from ½ to 2 microseconds in duration at a particular predetermined point in the positive half cycle of each cycle of the wave provided by oscillator 300. This pulse is amplified by amplifier 304 and employed to actuate transmitter 306 to cause it to energize antenna 312 to emit pulses of radio wave energy 314 of the above-mentioned duration and rate. These pulses strike a reflecting object 316 and are reflected as represented by wave 318 and received by antenna 312. The "TR box" 328 is a resonant cavity containing a gas-tube which breaks down at a relatively low voltage and is actuated by energy from transmitter 306 to detune the input to receiver 330 during the transmitting intervals, but quickly recovers during non-transmitting intervals so that received reflected pulses will freely enter receiver 330. The transmitter 306 usually employs a magnetron type vacuum tube having a high impedance when not energized so that substantially no received reflected wave energy will be lost in the transmitter.

The output of receiver 330 acts on control electrode 350 of a cathode ray oscilloscope 344 to intensity modulate the ray upon the receipt of a reflected wave pulse.

Energy from base oscillator 300 is also led to a second pulse generator 332. Part of the output of pulse generator 332 is led to saw-tooth wave sweep generator 334 and part to the modulation correction circuits 340 and 342.

The output of saw-tooth sweep generator 334 is led to balanced modulator circuits 336 which are, preferably, of the type illustrated in Fig. 11 and described in detail above.

Antenna 312 is provided with a parabolic reflector 310 and is positioned substantially at the focus thereof so that a high degree of directivity will be realized. The antenna and reflector assembly is mounted on a rotatable shaft 322 driven by a motor 334.

The directive beam of the antenna is thus caused to sweep or scan a circular area about its position as a center and by plotting on a suitable indicating means the azimuth angles and distances of all objects from which reflections are obtained, an indication of the type designated as a plan position indication is obtained.

A sine wave generator 326 is also driven by motor 324. The sine wave of generator 326 serves to provide a sine wave voltage the ultimate function of which is to effectively synchronize the rotation of the ray of the cathode ray oscilloscope with the rotation of the antenna.

To provide simultaneously a radial sweeping action whereby the indications provided by reflected signals will appear at distances from the center of the target which are proportional to their actual distances respectively from the scanning antenna, quadrature sine waves must be modulated by a higher frequency linear sweeping wave of the type commonly designated as a saw-tooth wave, each sweep wave starting in synchronism with the emission of a pulse and continuing for the time interval required for reception of a reflection from an object at the extreme range to be measured.

This modulation is, of course, effected in the balanced modulator circuits 336 a suitable form of which is as above-mentioned illustrated in Fig. 11 of the accompanying drawings. A 90 degree phase shifting network 338 is interposed between one balanced modulator 336 and sine wave generator 326 to provide a cosine or "quadrature" sine wave. The combination of sine and cosine waves thus obtained provides for the rotation of the ray of the oscilloscope in synchronism with the rotation of the antenna.

To eliminate unwanted sine wave modulations from each of the modulated quadrature waves obtained from modulators 336 modulation correction circuits 340 and 342 are next introduced into the respective paths of these waves before they are impressed upon the horizontal and vertical deflecting plates 346 and 348, respectively, of the cathode ray oscilloscope 344 as shown in Fig. 12. Preferred modulation correction circuits are of course shown in Figs. 1 and 5 and described in detail above. As mentioned above amplifiers may be employed if necessary, or desirable, between the correction circuits and the oscilloscope deflecting plates.

Fig. 13 shows the type of plan position indication provided by circuits of the type illustrated in Fig. 12. Point 360 represents the center point at which the observations are being made and indications 362, 364, 366, 368 and 370 represent five objects from which, during a complete rotation of the antenna, reflections are received, each being represented at an angle corresponding to its azimuth angle with respect to the observation point and at a radial distance from center point 360 proportional to its actual distance from the observation point.

Fig. 14 shows in block schematic diagram form modifications of the circuit of Fig. 12 by which it may be adapted to employ electronic modulating circuits 372, such as are illustrated in Figs. 6 and 9, in place of the balanced modulator circuits 336 and modulation correction circuits 340 and 342. In the modification indicated in Fig. 14 the pulse generator 332 connects solely to the electronic modulators 372. The output of sine wave generator 326 is again divided into two parts one of which is furnished directly to the left-hand modulator 372 and the other of which is shifted 90 degrees in phase by phase shifter 338 before being furnished to the right-hand modulator 327. The circuit is otherwise the same as that of Fig. 12, as described in detail above.

Numerous applications and modifications of the principles of the invention can readily be devised by those skilled in the art. No attempt has here been made to exhaustively cover all such possibilities. The scope of the invention is defined in the following claims.

What is claimed is:

1. In a system for modulating a sine wave by a higher frequency saw-tooth wave, a balanced vacuum tube modulator circuit, including two vacuum tubes each tube having at least a cathode, a control grid and an anode, a portion of the grid-cathode circuits of the two tubes being common, said modulator circuit being of the type in which the sine wave is applied to the balanced input of the modulator circuit and the saw-tooth modulating wave is applied in that portion of the grid-cathode circuits common to both vacuum tubes of the balanced modulator circuit, a modulation correction circuit comprising balanced series input impedances each comprising a resistor and a capacitor, a pair of output terminals, one of said terminals electrically connecting with one of said input impedances and the other of said terminals electrically connecting to the other of said input impedances, and in shunt between said input impedances and the said output terminals of the correction circuit, a balanced, two-way conducting, electronic short-circuiting circuit adapted to be operatively connected with control pulse sources, the pulses of which render the short-circuiting circuit effective, the pulses being synchronized to occur at the start of each saw-tooth wave cycle, whereby unwanted low frequency modulation of said modulated sine wave can be eliminated.

2. The system of claim 1 the electronic elements of the short-circuiting circuit being diode vacuum tubes.

3. In a system for producing modulation of an original sine wave by a higher frequency saw-tooth wave free from unwanted low frequency components, a balanced sine wave generator, a balanced pair of combinations of resistive and capacitative impedances upon which said original sine wave is impressed, a pair of output terminals connected by said balanced impedances to said generator, a balanced two-way conducting electronic switching circuit coupled in shunt relation between said balanced impedances and said output terminals to establish a short-circuiting path across the capacitative impedances at predetermined instants, said electronic switching circuit being adapted to be responsive to control pulses synchronized to occur at the desired predetermined instants corresponding to the starting instants of each saw-tooth wave cycle, but otherwise remaining inoperative.

4. The system of claim 3 the electronic elements of the electronic switching circuit being diode vacuum tubes.

5. The system of claim 3 the electronic elements of the electronic switching circuit being triode vacuum tubes.

6. The system of claim 3 the electronic elements of the electronic switching circuit being multielement vacuum tubes.

7. The system of claim 3 the control pulses being of substantial time duration whereby the saw-tooth modulations are separated by like substantial time intervals.

8. The combination which comprises a balanced electrical wave generator, a balanced two-way conducting electronic valve switching circuit adapted to operate only in response to recurrent control pulses, a pair of output terminals and a pair of balanced coupling circuits comprising resistive and capacitative elements electrically coupling said generator to said switching circuit and to said output terminals, said switching circuit being connected electrically in shunt relation across said output terminals.

9. The circuit of claim 8, said switching circuit including multielement vacuum tubes.

JOHN W. RIEKE.
ROBERT J. SHANK.

REFERENCES CITED

The following references are of record in the file of this patent:

UNITED STATES PATENTS

| Number | Name | Date |
|---|---|---|
| 1,876,107 | Usselman | Sept. 6, 1932 |
| 2,093,729 | Krawinkel | Sept. 21, 1937 |
| 2,189,549 | Hershberger | Feb. 6, 1940 |
| 2,293,628 | Reiling | Aug. 18, 1942 |
| 2,339,536 | Wendt | Jan. 18, 1944 |
| 2,250,284 | Wendt | July 22, 1941 |